Figures 1, 2:
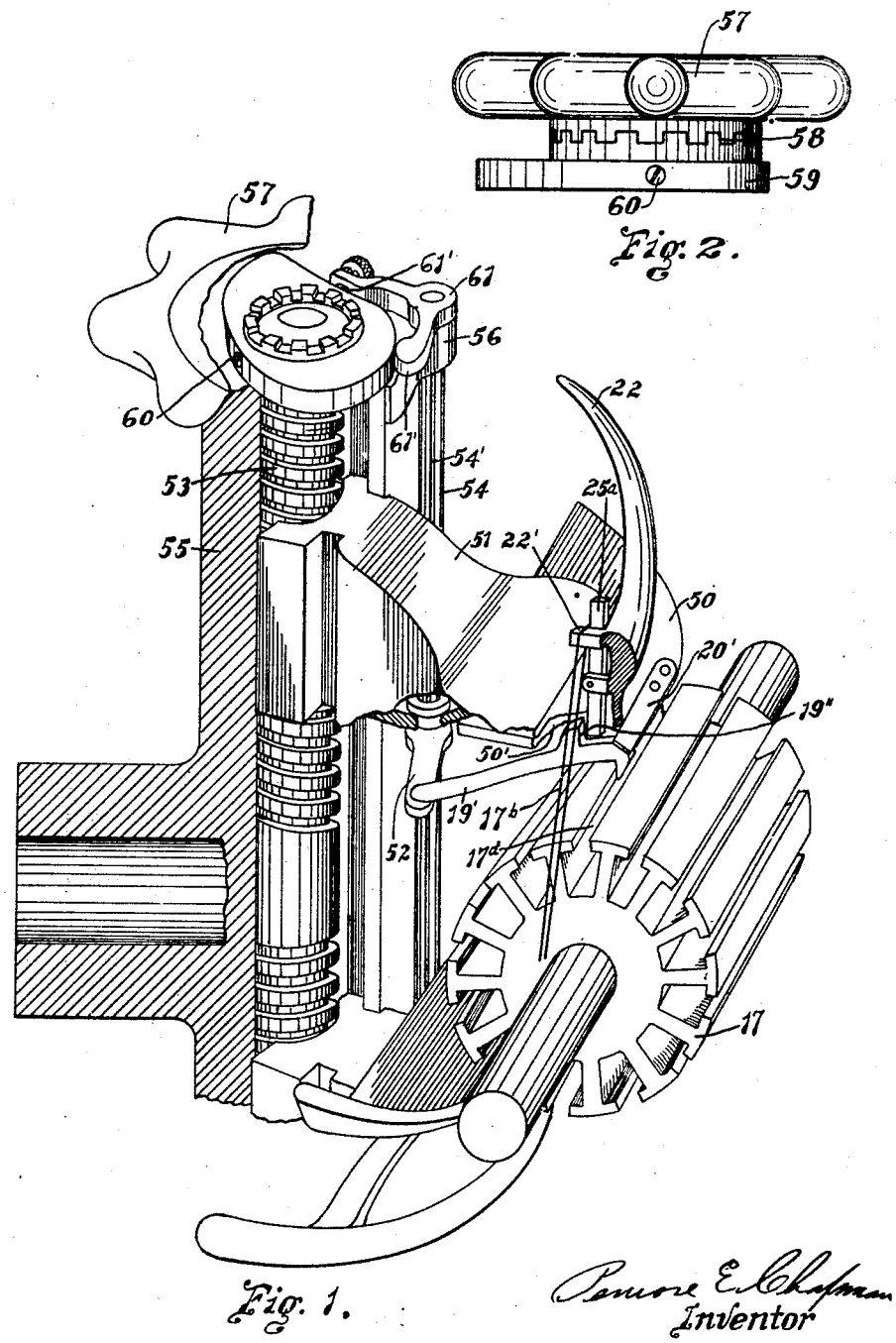

April 6, 1926.

P. E. CHAPMAN 1,579,808

ARMATURE WINDING MACHINE

Original Filed March 18, 1921

Pemore E. Chapman
Inventor

Patented Apr. 6, 1926.

1,579,808

UNITED STATES PATENT OFFICE.

PENROSE E. CHAPMAN, OF ST. LOUIS, MISSOURI.

ARMATURE-WINDING MACHINE.

Original application filed March 18, 1921, Serial No. 453,363. Divided and this application filed June 28, 1923. Serial No. 648,396.

*To all whom it may concern:*

Be it known that I, PENROSE E. CHAPMAN, a citizen of the United States, residing at St. Louis, State of Missouri, have invented a certain new and useful Improvement in Armature-Winding Machines, of which the following is a full, clear, and exact description, such as will enable others skilled in the art to which it appertains to make and use the same, reference being had to the accompanying drawings, forming part of this specification.

The object of my invention is the production of an armature winding machine of greater output. This application is in response to examiner's requirement for division of application Number 453,363 of series of 1915 to which it is allied.

I accomplish my object by combining an indexing device and lead discharger with my adjustable armature winding machine head which has been the subject of other applications and patents.

In the drawings Figure 1 is a cutaway elevation, showing an adaptation of this invention to one of my adjustable armature winding machine heads which will not be described, as it is a standard article of commerce. Fig. 2 is a detail of the actuating cam and dental coupling as described herein.

For the purposes of this application I will take the term "winding head" to mean that portion of an armature winding machine which engages the armature to be wound, and which has means for guiding the wire into place on said armature. In this modification I accomplish my object by providing an indexing device and lead discharger which may be simultaneously operated when the armature is released and secured in position for winding in one of my adjustable armature winding machine heads.

In Figure 1, 17 is an armature core to be wound which may be held in position for winding by any suitable means, as by gripping between a pair of jaws 50, one of which is shown cut away to reveal an indexing pawl, 19', which acts upon the teeth of the armature core, 17, through a groove or notch 50' cut in the jaw face, a crank, 52, actuates pawl, 19' and is rotatably connected to the jaw body, 51, so that it will move longitudinally with the jaw when the said jaw body, 55, is actuated as by the lead screw, 53, the crank, 19' in turn is keyed to the rocker shaft, 54, as by the use of the key way, 54' and is proportioned to slide longitudinally thereon.

Rocker shaft, 54, is itself secured to the body, 55, of the winding machine by suitable means, as bearing, 56.

To jointly actuate the securing device and the indexing device I provide some form of intermittent motion between the lead screw, 53, and the rocker shaft, 54, such as the cam, 59, and follower, 61.

The lead screw, 53, may be actuated by any suitable means as hand knobs, 57, on the lower side of which I prefer to attach half of a dental coupling, 58, the other member of said coupling being cut on the cam, 59, which may be secured into or out of engagement by any suitable means, such as set screw, 60, more clearly shown in Fig. 2. The operation of this indexing device is as follows:

The lead screw, 53, is actuated as by the hand knob, 57, releasing the armature secured between the jaws, 50; cam, 59, actuates the cam follower 61' which in turn actuates the rocker shaft, 54, crank, 52, and pawl, 19' moving it forward to the position shown in the drawing engaging lug, 19" with lower end of stripper 25ª as it moves, stripping lead 17ᵇ from snubbing pin 22'. Pawl, 19" engaging in slot 17ᵈ under the influence of spring 20' or other suitable element, which preferably exerts its greatest pressure as the pawl drops into the slot, after this has been accomplished the rotation of the hand knob is reversed the cam, 59, will become engaged with the opposed end of the cam follower, 61" and the pawl thereby actuated in the opposite direction, an amount that will advance the armature a desired number of teeth, usually one. The amount of advance can be adjusted by the screw 61" secured in the cam follower, 61, the cam, 59, having appropriate lands thereon that the lead screw, 53 may turn after the indexing has occurred sufficiently for any purpose, as clamping the armature between jaws, 50.

The advantages of releasing and securing the armature discharging the lead and indexing with the same motions that it formerly took for one operation combined with adjustability are too obvious for further comment.

It is obvious that many modifications can be made of my device as described without departing from the spirit of my invention.

Having now described my invention I wish to claim:

1. In an armature winding machine, the combination of adjustable means for winding an armature with an indexing device acting against the teeth of said armature.

2. In an armature winding machine the combination of means for winding an armature, with an adjustable indexing device which acts against the teeth of said armature.

3. In an armature winding machine the combination of adjustable means for winding an armature, and an indexing device acting against the teeth of said armature with a lead stripper.

4. In an armature winding machine having a lead screw, the combination of said lead screw with an indexing pawl acting against the teeth of said armature, and means for coupling said screw and said pawl.

5. In an armature winding machine, the combination of a lead screw, an indexing pawl acting against the teeth of said armature with adjustable means for coupling said screw and said pawl.

6. In an armature winding machine, the combination of a lead screw, an indexing pawl acting against the teeth of said armature with a coupling between said screw and pawl capable of transmitting intermittent motion to said pawl.

7. In an armature winding machine, the combination of a lead screw and an indexing pawl acting against the teeth of said armature with an adjustable intermittent coupling between said screw and said pawl.

8. In an armature winding machine, having a snubbing pin to aid in lead forming, the combination of adjustable means for winding an armature combined with means for stripping the armature leads from said snubbing pin.

9. In an armature winding machine, the combination of adjustable means for winding an armature having a lead screw and a lead stripper with means for coupling said screw and said stripper.

10. In an armature winding machine, the combination of means for holding an armature in position to be wound, and a lead stripper with an armature indexing pawl adapted to both index the armature and operate the stripper.

11. In an armature winding machine a lead screw, an indexing pawl with means for coupling said screw and pawl having a disengaging coupling therein.

12. In an adjustable armature winding machine, the combination of a lead screw, a cam adjustably secured thereto, a cam follower actuated thereby, a rocker shaft carrying said cam follower, a crank attached to said shaft, said crank actuating an indexing pawl adapted to engage the teeth of an armature to be wound.

13. In an adjustable armature winding machine, the elements recited in claim 12 combined with a lead stripper, actuated jointly therewith.

In testimony whereof I hereunto affix my signature this 26 day of June, 1923.

PENROSE E. CHAPMAN.